United States Patent [19]

Kidoh et al.

[11] 4,380,614

[45] Apr. 19, 1983

[54] SUSPENSION POLYMERIZATION OF HALOETHYLENE COMPOUND

[75] Inventors: Kunizoh Kidoh; Hideki Wakamori, both of Iwaki, Japan

[73] Assignee: Kureha Kagaku Kogyo Kabushiki Kaisha, Tokyo, Japan

[21] Appl. No.: 222,924

[22] Filed: Jan. 6, 1981

[30] Foreign Application Priority Data

Mar. 10, 1980 [JP] Japan .................................. 55/29950

[51] Int. Cl.$^3$ ........................ C08F 2/20; C08F 114/06
[52] U.S. Cl. ....................................... 526/62; 526/89; 526/74; 526/200; 526/202; 526/204
[58] Field of Search .................... 526/62, 74, 200, 204, 526/208, 209, 210, 225

[56] References Cited

U.S. PATENT DOCUMENTS 4,007,320  2/1977  Petersen .............................. 526/62
4,117,216  9/1978  Witenhafer .......................... 526/62
4,152,500  5/1979  Foschi ................................. 526/74

OTHER PUBLICATIONS

Chem. Abst., 54535z (1971).
Encyclopedia of Chem. Technology, p. 371 (1968).

Primary Examiner—Christopher A. Henderson, Jr.
Attorney, Agent, or Firm—Oblon, Fisher, Spivak, McClelland & Maier

[57] ABSTRACT

A suspension polymerization of a haloethylene compound or a mixture of a haloethylene compound and a comonomer thereof is carried out in an aqueous medium containing a suspending agent and an oil soluble catalyst, by coating or incorporating at least one of a water soluble or organic solvent soluble lignin derivative.

4 Claims, No Drawings

SUSPENSION POLYMERIZATION OF HALOETHYLENE COMPOUND

BACKGROUND OF THE INVENTION

1. Field of the Invention

The present invention relates to a process for producing a polymer or copolymer of a haloethylene compound by a suspension polymerization in an aqueous medium. More particularly, it relates to a process for inhibiting a formation of a scale of a polymer on an inner wall of a reactor, a surface of a stirrer or other parts contacting the monomer.

2. Description of the Prior Arts

As it is well known, a polymer is adhered on an inner wall of a reactor, surfaces of equipments in the reactor such as a stirrer, a baffle plate, a thermodetector etc. in a suspension polymerization of at least one monomer of haloethylene compounds such as vinyl chloride, vinyl fluoride, vinylidene chloride, vinylidene fluoride, tetrafluoroethylene, and chlorotrifluoroethylene or a mixture thereof or a mixture of the haloethylene compound and a comonomer thereof in the presence of an oil soluble catalyst and a suspending agent in an aqueous medium, whereby an yield of the polymer is reduced and a function for controlling a polymerization temperature is reduced and the product is contaminated with the adhered scale to decrease the quality of the product as the disadvantages.

In view of the use of the reactor, it takes excess time and excess labour for removing the scale to disadvantageously decrease the workability and the productivity.

The adhesion of the scale on the reactor is serious trouble for the continuous process for the polymerization. The adhesion of the scale is depending upon the substrate of the reactor. The adhesion of the scale is remarkably severe in the use of the metallic substrates whereas it is slightly reduced in the use of glass lining substrates, though the disadvantages can not be eliminated.

Various studies have been made for the inhibition of the adhesion of the scales. Each method has certain disadvantage with certain advantage, and any optimum method has not been found.

SUMMARY OF THE INVENTION

It is an object of the present invention to overcome the above-mentioned disadvantages and to provide a novel suspension polymerization of a haloethylene compound under inhibiting adhesion of a scale of the polymer.

The foregoing and other objects of the present invention have been attained by providing a suspension polymerization of a haloethylene compound or a mixture of a haloethylene compound and a comonomer thereof such as vinyl chloride, a mixture of vinyl chloride, and a comonomer thereof, a mixture of vinylidene chloride and a comonomer thereof, vinylidene fluoride, and a mixture of a vinylidene fluoride and a comonomer thereof, in the aqueous medium containing an oil soluble catalyst and a suspending agent, wherein (a) a water soluble lignin is incorporated; (b) a water soluble lignin or an organic solvent soluble lignin is coated on an inner wall of a reactor and surfaces of internal equipments; or both of (a) and (b) are given.

DETAILED DESCRIPTION OF THE PREFERRED EMBODIMENTS

In accordance with the process of the present invention, the adhesion of the polymer on the wall of the reactor can be easily and remarkably reduced without failure, especially the adhesion can be substantially prevented in the polymerization.

In usual, lignin means a main component for forming skeletons of plants together with cellulose and hemicellulose. Various methods of separating lignin from plants have been known. The lignin used in the present invention should impart the effect of the present invention by an incorporation in the aqueous medium or a coating on the wall of the reactor. Therefore, suitable lignins include water soluble lignins such as ligninsulfonic acid or water soluble salts thereof and alkali lignins; and organic solvent soluble lignins such as alcohol-lignin, acetone-lignin, dioxane-lignin and acetic acid-lignin. Such lignins are complicated natural polymers of phenylpropane having phenolic OH group and methoxy group. The molecule of lignin has various polar groups such as ether bond, carbonyl group, carboxyl group, methylenedioxy group and hydroxyl group. Ligninsulfonic acid has sulfonic acid group. Therefore, such lignin is highly adsorbed on a metallic surface to form a monomolecular layer whereby the metallic surface is protected or partitioned from the environment.

It has been known to use a pulp waste solution for preventing corrosion of a boiler. On the other hand, it has been known to use a material having phenolic hydroxyl group for preventing a polymerization in a radical polymerization system.

The lignin used in the process of the present invention highly adheres on the metallic surface in the reactor whereby the contact of the monomer with the metallic surface as the reason of the adhesion of the polymer is prevented. Moreover, even though the monomer contacts with the metallic surface, phenolic hydroxyl group of the lignin inhibits the polymerization to prevent effectively the adhesion of the scale in the polymerization system.

The water soluble lignins and organic solvent soluble lignins used in the process of the present invention are remarkably effective scale-inhibitors and accordingly, it is effective to incorporate only small amount of the lignin in the aqueous medium in the polymerization or to coat on the inner wall of the reactor. Remarkable effect for inhibiting the adhesion of the scale can be given by incorporating the water soluble lignin at a ratio of only 1 to 100 ppm based on the monomers. When it is less than 1 ppm, the effect is not satisfactory whereas when it is more than 100 ppm, the inhibition of the polymerization and the deterioration of heat stability are disadvantageously caused.

In the coating method, the water soluble lignin is dissolved in water or the organic solvent soluble lignin is dissolved in an organic solvent such as alcohols and acetone, and the solution is coated on the inner wall of the reactor or the surface of the internal equipments. The amount of the lignin is enough to form a monomolecular layer and preferably more than 0.001 g/cm$^2$ as the lignin. The coating method can be the conventional methods such as a spray coating method and a brush coated method, and is to adsorb the lignin on the inner wall of the reactor etc. and is not critical. After coating, it is possible to dry it. Thus, the effect of the lignin may not be lost without drying or with slight water washing.

For example, in the case of large size polymerization reactor, it is enough to spray about 1% of a dilute aqueous solution of the lignin on the inner wall of the reactor and to discharge the aqueous solution flowed down from the bottom and then to charge the components for the polymerization. The coated layer may not be removed even though the coated layer is slightly washed with water after the coating.

In the process of the present invention, the effect for inhibiting the adhesion of the scale is especially improved by coating the water soluble lignin or the organic solvent soluble lignin on the inner wall of the reactor or the surface of the equipment and incorporating the water soluble lignin in the suspension polymerization solution at a concentration of 1 to 100 ppm (based on the monomers). The lignin used for the coating can be the same as or different from the lignin incorporated in the suspension polymerization solution.

The lignins used in the process of the present invention are usually pale brown or dark brown amorphous powder and have effect for inhibiting the polymerization. Therefore, it is not preferable to use excess of the lignin in the coating on the surface or in the incorporation in the suspension polymerization solution.

The components for the polymerization of the present invention can be the conventional components.

The suspending agents can be the conventional suspending agents such as polyvinyl alcohol, partially hydrolyzed polyvinyl acetate, acetic acid-maleic anhydride copolymer, polyacrylic acid salts, gelatin, starch, and cellulose derivatives such as methyl cellulose, hydroxyethyl cellulose and hydroxypropyl cellulose.

The polymerization catalysts can be radical catalysts such as oil soluble hydroperoxide, acyl peroxides such as lauroyl peroxide and benzoyl peroxide; peroxydicarbonates such as diisopropyl peroxydicarbonate; and azo compounds such as azobisisobutyronitrile.

The effect of pH of the aqueous medium is considered for the adsorption of the lignin on the metallic surface. In order to control pH of the aqueous medium or pH of the coating solution, it is effective to add a buffer agent such as alkali phosphates and alkali polyphosphates.

The comonomers which are copolymerizable with the haloethylene compound in the polymerization of the present invention can be vinyl ester, vinyl ethers, acrylic acid, methacrylic acid, esters of acrylic or methacrylic acid, vinylidene halide, maleic acid, fumaric acid, esters of maleic or fumaric acid, and olefins such as ethylene and propylene.

The present invention will be further illustrated by certain examples and references which are provided for purposes of illustration only.

EXAMPLE 1

Into a 10 liter autoclave made of stainless steel equipped with a two step paddle type stirrer, 6300 g. of deionized water, 3.0 g. of partially hydrolyzed polyvinyl alcohol, 3.0 g. of lauroyl peroxide, 0.06 g. of sodium ligninsulfonate (20 ppm based on the monomer) were charged and nitrogen gas was fed to purge the system and 3000 g. of vinyl chloride was added to polymerize it at a polymerization temperature of 58° C. for 15 hours with stirring at 400 rpm. There was not any adhesion of a scale on the inner wall of the autoclave and the surface of the stirrer.

On the other hand, the polymerization was carried out in the same reactor under the same condition except that sodium ligninsulfonate was not added. The polymer layer having a thickness of 0.1 mm was adhered on the whole surface in the reactor.

EXAMPLE 2

In accordance with the process of Example 1 except that the same amount of alkali lignin was added instead of sodium ligninsulfonate, the polymerization was carried out. As a result, there was not any adhesion of a scale on the inner wall of the autoclave and the surface of the stirrer.

EXAMPLE 3

On the inner wall of the autoclave and the surface of the stirrer of Example 1, 1% aqueous solution of sodium ligninsulfonate was sprayed and the autoclave was slightly washed with water. In the autoclave, 6300 g. of deionized water and 3.0 g. of partially hydrolyzed polyvinyl alcohol were charged and nitrogen gas was fed to purge the system and 3000 g. of vinyl chloride containing 1.0 g. of diisopropyl peroxydicarbonate was charged to polymerize it at 58° C. for 8 hours. There was not any adhesion of a scale on the inner wall of the autoclave and the surface of the stirrer.

The same polymerization was repeated for 5 times by the same operation. There was not any adhesion of a scale.

EXAMPLE 4

On the inner wall of the autoclave and the surface of the stirrer of Example 1, 1% acetone solution of acetone-lignin was sprayed, and the solution flowed down was discharged and the inner part of the autoclave was dried up. The polymerization was carried out by using the components of Example 1 under the polymerization condition of Example 1. There was not any adhesion of a scale on the inner wall of the autoclave and the surface of the stirrer.

EXAMPLE 5

On the inner wall of the autoclave, and the surface of the stirrer, 1% aqueous solution of sodium ligninsulfonate was sprayed and the autoclave was slightly washed with water. In the autoclave, 5000 g. of water dissolving 3 g. of methyl cellulose and 0.05 g. of alkali lignin was charged and nitrogen gas was fed to purge the system and a mixture of 2000 g. of vinylidene chloride and 500 g. of vinyl chloride dissolving 2.5 g. of diisopropyl peroxydicarbonate was compressed to polymerize them at a polymerization temperature of 45° C. for 60 hours with stirring at 120 rpm. There was not any adhesion of a scale on the inner wall of the autoclave.

On the other hand, the same polymerization was carried out except that the spray of the aqueous solution of sodium ligninsulfonate was not carried out and the alkali lignin was not added. The polymer layer having a thickness of 0.1 mm was adhered on the whole surface in the reactor.

We claim:

1. In a suspension polymerization of a haloethylene compound or a mixture of a haloethylene compound and a comonomer thereof in a aqueous medium containing a suspending agent and an oil soluble catalyst in a reactor, an improvement characterized by coating a water soluble or organic solvent soluble lignin derivative on an inner surface of said reactor or a surface of equipment contained within said reactor or by incorporating said lignin derivative in said aqueous medium at a concentration of 1 to 100 ppm based on said haloethylene compound.

2. In a suspension polymerization of a haloethylene compound or a mixture of a haloethylene compound and a comonomer thereof in an aqueous medium containing a suspending agent and an oil soluble catalyst in a reactor, an improvement characterized by coating a water soluble or organic solvent soluble lignin derivative on an inner surface of said reactor or a surface of equipment contained within said reactor.

3. The suspension polymerization according to claim 2 or 1, wherein said lignin derivative is lignin sulfonic acid, a salt of lignin sulfonic acid, alkali lignin, alcohol-lignin, acetone-lignin, dioxane-lignin or acetic acid-lignin.

4. The suspension polymerization according to claim 1, wherein said lignin derivative is incorporated in said aqueous medium at a concentration of 1 to 100 ppm based on said haloethylene compound and said lignin derivative is coated on an inner surface of said reactor or a surface of equipment contained within said reactor.

* * * * *